BEST AVAILABLE COPY

United States Statutory Invention Registration [19]

[11] Reg. Number: H402

Julian et al. [43] Published: Jan. 5, 1988

[54] HIGH ENERGY ABSORBING PRESTRESSED CONCRETE FENDER PILES AND FENDERING SYSTEM

[75] Inventors: Robert W. Julian, Oxnard, Calif.; Robert F. Mast, Auburn; Joseph R. Schlechten, Puyiallup, both of Wash.; George E. Warren, Oxnard, Calif.; Manfred H. Zinserling, Renton, Wash.

[73] Assignee: The United States of America as represented by the Secretary of the Navy, Washington, D.C.

[21] Appl. No.: 43,272

[22] Filed: Apr. 23, 1987

[51] Int. Cl.[4] ..... E02D 3/22

[52] U.S. Cl. ..... 405/212; 405/256

*Primary Examiner*—Deborah L. Kyle
*Assistant Examiner*—Michael J. Carone
*Attorney, Agent, or Firm*—Louis Allahut; Joseph M. St.Amand

[57] ABSTRACT

A high-energy-absorbing prestressed concrete fender pile, and fendering system using a plurality of such piles, constructed from high-strength concrete prestressed with longitudinal tensioned strands only partially prestressed such that the longitudinal strands remain elastic to provide high remaining material strength for absorbing high energy impact prior to reaching the yield strength of the strands; the longitudinal tensioned strands are wrapped with an outer spiral wire reinforcement, and the longitudinal strands are preferably stressed to remain elastic until the concrete reaches a capacity of 0.003 inch/inch compression strain.

21 Claims, 13 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

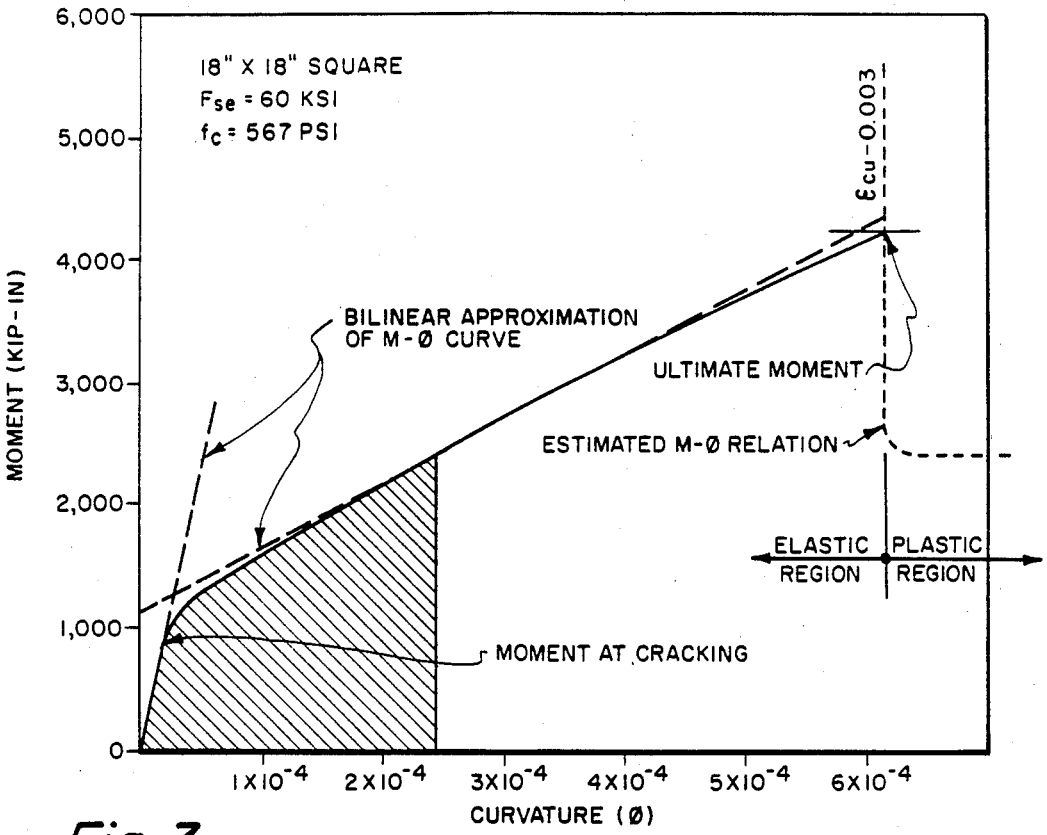
Fig. 3. MOMENT-CURVATURE RELATIONSHIP
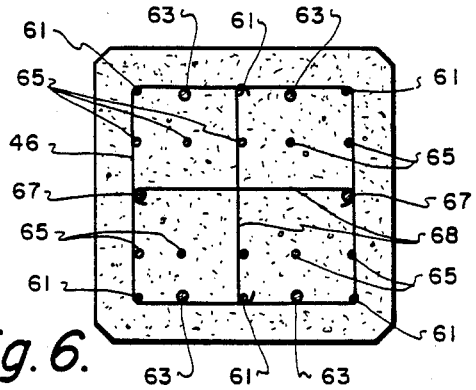
Fig. 6.
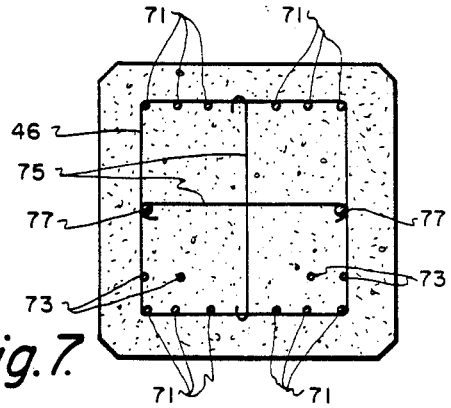
Fig. 7.
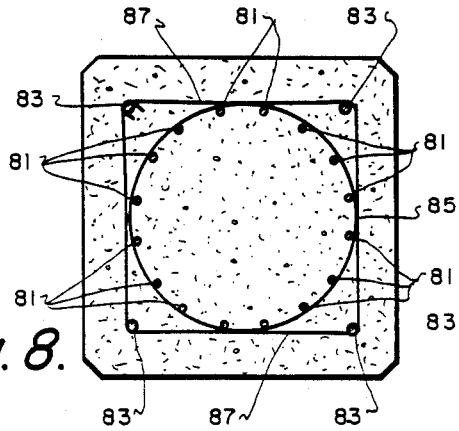
Fig. 8.
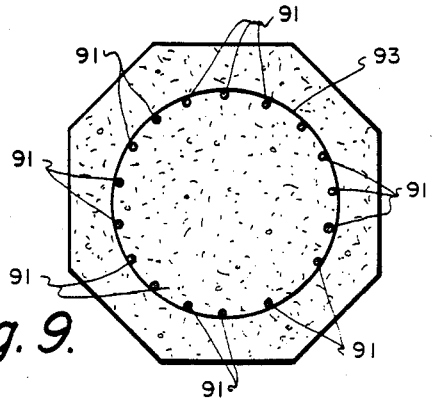
Fig. 9.

HIGH ENERGY ABSORBING PRESTRESSED CONCRETE FENDER PILES AND FENDERING SYSTEM

BACKGROUND OF THE INVENTION

This invention relates to fender piles and fendering systems, and more particularly to prestressed concrete fender piles having limited prestressing to allow for greater elasticity in bending and greater energy absorption.

Fender systems are used to protect waterfront piers, wharves, docks, and the like from the hazards of ship mooring and berthing. Berthing facilities and ships are subjected to various types of contact and loading during the mooring process or during berthing periods. Contacts between ship and fender system may be in the form of heavy impact, abrasive action from vessels, or direct pressure. Such contacts may cause extensive damage to the ship and to the pier structure if suitable means are not employed to counteract them. Fender piles are a key element developed for this purpose. Impact energy upon a fender pile is absorbed by deflection. Energy-absorption capacity depends on size, length, penetration, and material of the pile, and is determined on the basis of internal strain-energy characteristics. Fender systems are a troublesome and expensive high maintenance item for port operators because they are subject to frequent damage. A key to the performance of the fender system is the line of fender piles which guard a pier, receive the loads from the impact of ships, and distribute attenuated reactions to the seafloor soil and to appropriate locations on the pier.

More conventional fender piles are made from steel or timber. On a system basis, a large energy-absorbing rubber fender is required in a steel system to absorb ship impact energy, and steel is highly subject to rust and corrosion. Timber systems, on the other hand, are very good energy absorbers, but the total energy that timber pile can absorb is severely limited.

To overcome the constraints of steel and timber pile systems, prestressed concrete fender piles were developed that, on a pile-for-pile basis, can absorb significantly more energy than either steel or timber piles. In addition, using the prestressed concrete fender piles of the present invention, a prestressed concrete fender system is more cost effective than a more conventional fender system made from steel or timber piles. In addition to surpassing conventional steel and timber piles in terms of economics and energy absorption, the prestressed concrete piles of this invention also surpass in durability.

SUMMARY OF THE INVENTION

It is an object of the invention, therefore, to provide a prestressed concrete high energy absorbing pile having high elasticity.

Another object of the invention is to provide a prestressed concrete high energy absorbing pile having partially prestressed reinforcing strands which allow substantial elasticity in bending and return of the pile to its original form following energy absorption.

A further object of the invention is to provide a cost effective prestressed concrete pile for replacing conventional timber and steel fender piles.

Other objects, advantages and novel features of the invention will become apparent from the following detailed description of the invention when considered in conjunction with the accompanying drawings.

BRIEF DESCRIPTION OF THE DRAWINGS

FIG. 3 is a graph showing moment-curvature relationship for a typical prestressed concrete fender pile.

FIG. 6 is a cross sectional view, which also can be taken along line 5—5 of FIG. 4, but which uses 14 prestressed strands positioned in four rows.

FIG. 7 is a cross sectional view of a high-energy-absorbing prestressed concrete pile using prestressed and unstressed strands.

FIG. 8 is a cross sectional view of a prestressed concrete pile using prestressed strands in a circular pattern.

FIG. 9 is a cross sectional view of an octagonal prestressed concrete pile.

DESCRIPTION OF THE PREFERRED EMBODIMENTS

Figure 1:
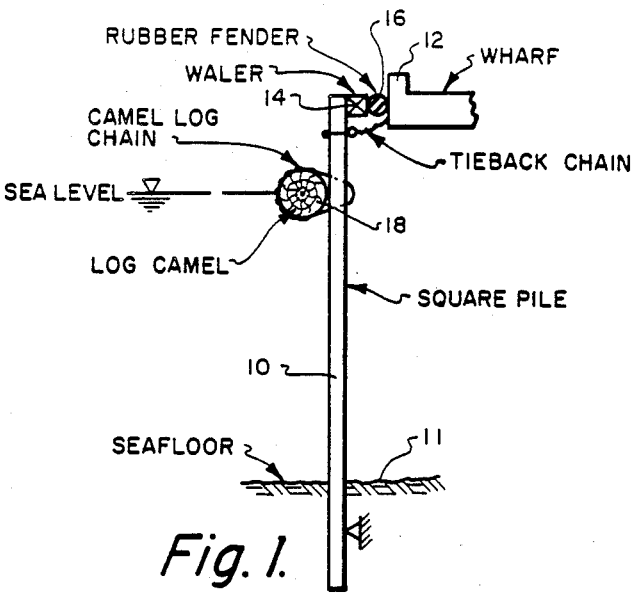
FIG. 1 is a side elevational view of a typical basic fendering system using prestressed concrete piles.
Figure 2:
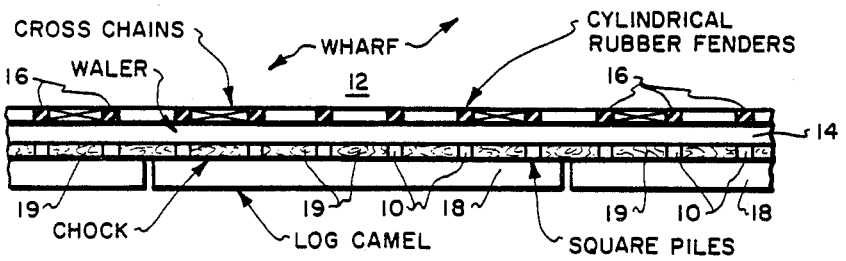
FIG. 2 is a top view of the fendering system shown in FIG. 1.

A fendering system utilizing high-energy-absorbing prestressed concrete fender piles is shown in a basic form in FIGS. 1 and 2. A row of high-energy-absorbing prestressed concrete piles 10 are driven into the seafloor 11, as shown, adjacent wharf or pier 12. The fender piles 10 distribute ship impact energy to other members of the fendering system. The piles deflect (elastically), absorbing all or some of the impact energy, and transfer a reaction to the pier 12. A waler 14 and elastomeric/-rubber fenders 16 can be placed at the head of piles 10, as shown to absorb energy in addition to that absorbed by the piles. By making the fender piles 10 a part of the energy-absorbtion system, the piles are used more efficiently, producing a more effective and economical fender system. Log camels 18 are used at the waterline to distribute ship berthing impact among the piles. Timber is used for the whaler 14 and chocks 19 between piles.

Other means for incorporating prestressed concrete piles into fender systems include substituting concrete or steel for the timber wale/chock system described above. Besides the cylindrical elastomeric/rubber fenders 16, other elastomeric fenders, such as the v-type and buckling cell, can be used.

The preferred embodiment of a high-energy-absorbing prestressed concrete pile of the present invention, one which has the most energy absorbing capability, is a square pile with prestressing reinforcing strands in a rectangular pattern stressed to a level of 60 ksi in the strands. This low initial stress means there is an additional 180 ksi of material strength remaining for use in absorbing impact prior to reaching the yield strength of the strands. This stress range maximizes the energy that can be absorbed by the pile.

Pile performance in the working stress range is essentially independent of concrete strength but is highly dependent on prestressing force and stress in the strands. However, the ultimate total energy absorption of the pile is dependent on concrete strength. A high-strength, high-quality concrete, such as normal-weight 8000-psi concrete is preferred. This strength concrete can be achieved economically. Such concrete is desirable because it provides both higher moment capacity and higher ultimate curvature than lower unit weight concretes. High-strength, high-quality concrete also has reduced permeability and hence reduces corrosion potential of the reinforcing strands, thereby enhancing durability.

Adequate curvature of the pile cross-section under load is necessary to create an energy-absorbing pile. Curvature (rotational capacity of the cross-section) is related to the reinforcing steel strain range. High-strength reinforcement (prestressing strand) is used to maximize the curvature. The optimum energy-absorbing condition is achieved when the tension reinforcement yields at the same time as the concrete compression strain reaches 0.003 inch/inch. In this condition, the pile remains basically elastic (bilinear) and will essentially return to its original shape after unloading.

All fender piles must be able to withstand a frequently occurring impact without damage to the pile. Some damage is acceptable for a rare and extreme event. The ability of a concrete pile to withstand an extreme event is defined as that point where the concrete shell of the prestressed pile spalls and exposes the reinforcing steel. This type of damage requires repairs or replacement of the damaged piles. However, this does not mean that the pile has failed, as the pile can still absorb a significant amount of additional energy as part of the functioning fender system if it properly reinforced for ductile performance.

As shown on the curve of FIG. 3, high-energy-absorbing prestressed concrete fender piles develop serviceable cracks at relatively low energy (i.e., moment) input. The upper limit of serviceability for the pile, however, is that point where the outer shell of the pile fails by crushing of the concrete and spalling of the cover over the spiral reinforcing and tensioned steel strands. A large amount of usable energy can be absorbed after the initial cracking of the pile and before spalling of the concrete shell.

While some serviceable cracking occurs from berthing impacts in the relatively elastic piles, the prestressing forces close the cracks following the berthing impact, thus inhibiting corrosion of the reinforcing steel strands.

The design is focused on energy developed in a deflected pile prior to reaching the ultimate moment capacity of the pile. To limit potential permanent set, the prestressing steel is designed to remain elastic until the concrete reaches its ultimate capacity at a 0.003 inch/inch strain. The resultant moment-curvature relationship for the cross section is approximated as the bilinear curve, shown in FIG. 3. The initial curve or slope is steeper because the concrete has not cracked. After the concrete cracks, the curve flattens out. The amount of prestressing steel reinforcement, the degree to which it is prestressed, and its location in the pile cross-section directly influence the ultimate moment and curvature capacities of the cross-section.

Soft piles are defined as having a relatively low reaction to energy ratio (i.e., R/E ≤ 1.0). The R/E ratio is calculated at an ultimate concrete strain of 0.003 inch/inch. The number of steel reinforcing strands used for soft piles is based on the pile cross-section and an effective tensioning in the strands of approximately 60 ksi. This provides a usable elastic steel stress range (i.e., stress range) of 240 minus 60=180 ksi. This range is three times as great as that for mild steel reinforcement.

A stiff pile with lower energy-absorbing capacity contains a higher effective prestress with the strands arranged in either concentric or eccentric patterns. Stiff piles are defined here as having a high reaction to energy ratio (i.e., R/E ≥ 1.3). For eccentricically prestressed piles, a minimum prestress level of 400 psi along one side may be used to minimize potential for surface cracking of the piles during driving and handling.

Figure 4:
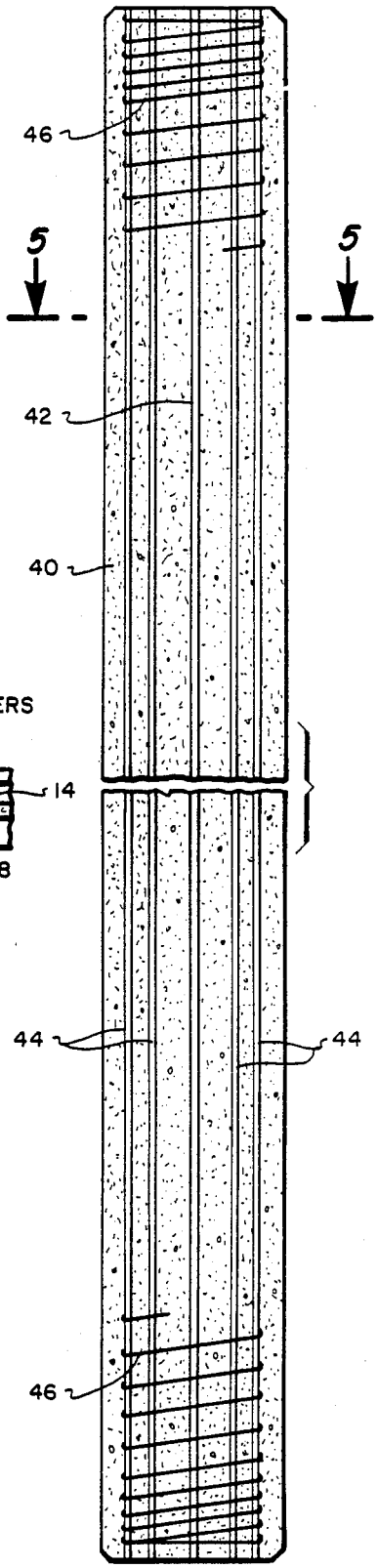
FIG. 4 is a cross sectional side elevational view of typical high-energy-absorbing prestressed concrete fender pile of this invention.

A typical high-energy-absorbing prestressed concrete pile 40 is shown in FIG. 4 having vertical reinforcing rebar 42 and stressed strands 44, together with spiral outside reinforcement wire 46. In the preferred embodiments discussed herein, all variations of the pile use ½-inch diameter, 270 ksi, 7 wire, low relaxation prestressing strands, and an effective compressive prestress of 450 psi. The concrete is confined by spiral 42 made of W11 cold drawn wire. High strength concrete is employed having a compressive strength at 28 days of 8,000 psi. An 18-inch square cross section is used in all but one of the examples described below; however, within the scope of the disclosure, other rectangular, polygonal or circular cross sections are possible and concentrically or eccentricallly prestressing can be used. Pile length is dependent on application but is typically 65 feet. Various cross-sectional configurations are depicted in FIGS. 5, 6, 7, 8 and 9, by way of example.

Figure 5:
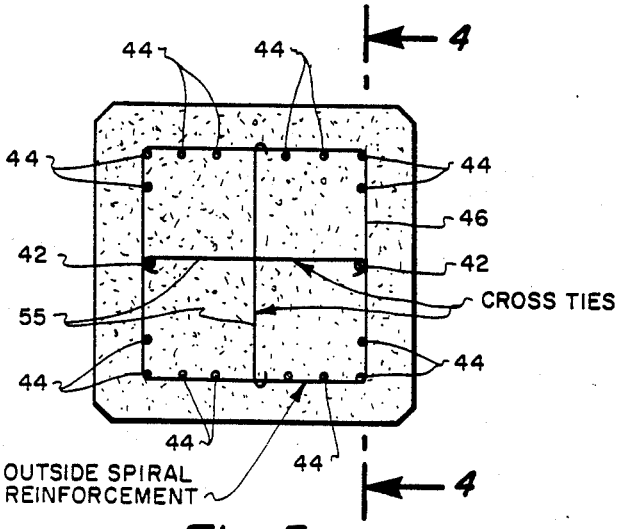
FIG. 5 is cross sectional view, taken along line 5—5 of FIG. 4, using prestressed strands in a square pattern.

The cross-sectional configuration of FIG. 5 contains sixteen prestressed strands 44 spaced approximately 2-inches apart at their closest proximity to each other toward the front and back sides of the pile, in a square formation as shown; a row of six strands at front and back, respectively, with a single strand spaced inwardly toward the pile center from each end of the six-strand rows. In addition, two rebar reinforcements 42, located at either side, and cross ties 55 can be used, if desired. Where cross-ties are not used, rebar 42 can be omitted as it is only used to anchor the cross ties in the sideways position. With the exception of approximately 5 turns at a pitch of 1½ inches at either end of pile 40, spiral outside reinforcement 46 is wound at a 3-inch pitch along the entire length of the pile.

In the configuration, as shown in FIG. 6, there are three prestressed strands 61 and two rebars 63 positioned alternately in a row along the front and back of the pile. A row of five equally spaced prestressed strands 65 are located at the same spacing inwardly from each end of the front and back rows, respectively. Rebars 67 are located similarly to rebars 53 in FIG. 5, and also may be eliminated if optional cross ties 68 are not used. This configuration represents a pile with the greatest energy-absorbing characteristics and the lowest reaction to energy relationship. The prestressing steel strands 61 do not yield prior to reaching ultimate strength of the pile.

The configuration of FIG. 7 is the same as FIG. 5 only with respect to the front and back rows of prestressed strands 71. Spaced inwardly from the back side of the pile, a distance equal to the spacing between strands 71, are four unstressed strands 73, as shown. The unstressed strands 73 contribute to improve the failure characteristics of the pile by delaying strand yield. Cross ties 75 are optional, as are rebars 77.

In the cross sectional configuration of FIG. 8, sixteen prestressing strands 81 are arranged in a circular pattern, with four rebars 83 at the corners. A circular reinforcing outside wire spiral 85 of is used, augmented with #3 ties 87 at 12-inches on center for rebars 83. This configuration does not absorb as much energy as the configurations of FIGS. 5–7, but it is easier to construct as circular reinforcing spirals are easier to work with.

The configuration of FIG. 9 is an octogon shape chosen to represent a non square. Eighteen symmetrically arranged prestressing strands 91 are used in this arrangement with a circular spiral reinforcement wire 93. This type of section does not perform as well as FIGS. 5–8 due to loss of width at the compression face. Energy absorption capacity is less because the overall cross-sectional properties are smaller.

The TABLE below gives an energy summary of the various configurations discussed:

| Configuration | FIG. 5 | FIG. 6 | FIG. 7 | FIG. 8 | FIG. 9 |
|---|---|---|---|---|---|
| Size (inches) | 18 × 18 | 18 × 18 | 18 × 18 | 18 × 18 | 18 dia. |
| Total Strands | 16 | 14 | 16 | 16 | 18 |
| Tensioned Strands | 16 | 14 | 12 | 16 | 18 |
| Initial Prestress Force | 164k | 162k | 160k | 164k | |
| Design Prestress Force | 146k | 146k | 146k | 146k | |
| Design Concrete Stress | 450 psi | 450 psi | 450 psi | 450 psi | |
| Spiral Reinforcement Pitch | 3 inch | 3 inch | 3 inch | 3 inch | 3 inch |
| Concrete | Normal | Normal | Normal | Normal | Normal |

Fiber reinforcing can be added to the concrete, if desired, to improve the spalling characteristics of the concrete cover (i.e., concrete area outside the spiral reinforcement), delaying its occurrence during loading.

Epoxy coated prestressing strand and reinforcement can be used to enhance corrosion protection. However, since the fender piles are highly elastic members which spring back to a neutral position closing any flexure cracks from instantaneous berthing or other loads, such additional corrosion protection may not be warranted.

The piles used in the fendering system shown in FIGS. 1 and 2, are used with a log camel. They can also be used in a similar arrangement without a camel, in which case rub strips may be needed. Ultra high molecular weight plastic, rubber, timber, etc., rub strips can be used.

High-energy-absorbing fender piles as disclosed can be used in conjunction with commercially available foam filled fenders to form very high energy absorbing fender systems, which also provide a camel offset from a pier. In these systems the prestressed concrete piles are used as reaction piles for the foam filled fenders.

Examples of these very high energy absorbing fender systems are discussed below.

Figure 10:
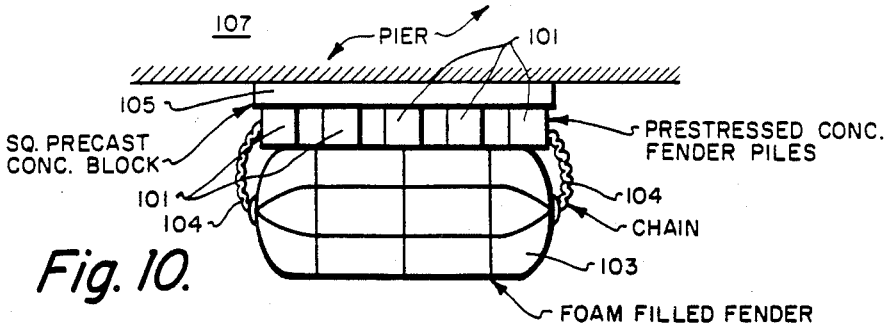
FIG. 10 shows a partial plan view of a very high energy absorbing fendering system using closely spaced high-energy-absorbing prestressed concrete piles and a foam filled fender.
Figure 11:
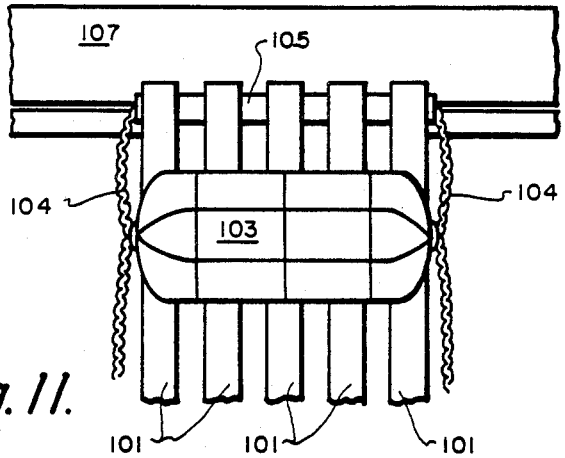
FIG. 11 is a partial front elevational view of the fendering system shown in FIG. 10.

As shown in FIGS. 10 and 11, only closely spaced high-energy-absorbing prestressed concrete fender piles 101 are used in conjunction with a foam filled fender 103. Chains 104 attach the foam filled fender 103 to piles 101. The prestressed concrete piles 101 are spaced approximately one foot apart. A precast concrete block whaler 105 spaces the upper ends of piles 101 from the pier 107.

Figure 12:
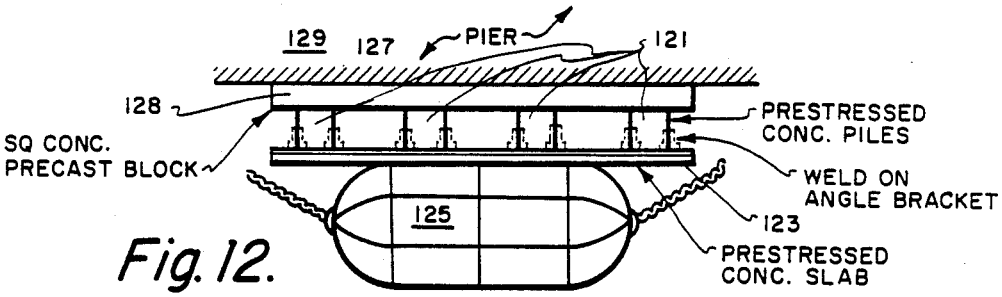
FIG. 12 also shows a very high energy absorbing fendering system using high-energy-absorbing prestressed concrete fender piles in conjunction with a prestressed concrete slab and foam filled fender.
Figure 13:
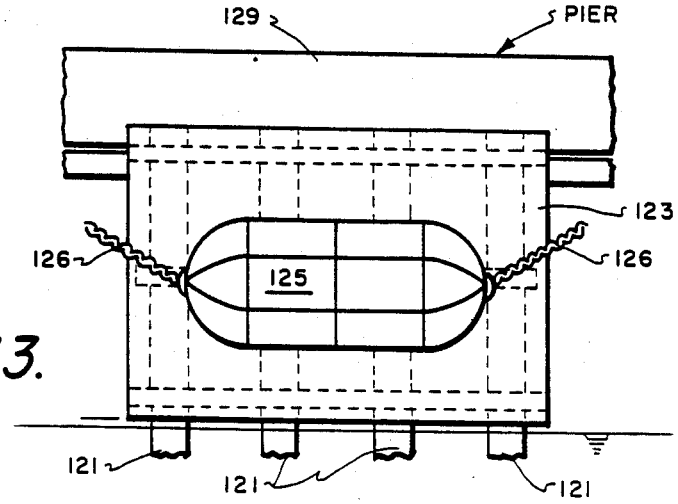
FIG. 13 is a partial front elevational view of the fendering system shown in FIG. 12.

In the fendering system shown in FIGS. 12 and 13, prestressed concrete piles 121 support a concrete bearing panel 123. The piles are spaced approximately 3-feet apart. Foam filled fender 125 is supported from chains 126. The concrete bearing panel 123 is a prestressed slab with steel embedment, and is attached to piles 121 with welded on brackets 127, for example. A concrete waler 128 spaces the upper ends of fender piles 121 from pier 129.

Obviously many modifications and variations of the present invention are possible in the light of the above teachings. It is therefore to be understood that within the scope of the appended claims, the invention may be practiced otherwise than as specifically described.

What is claimed is:

1. A high-energy-absorbing prestressed concrete fender pile, comprising:

(a) a plurality of parallel prestressed metallic longitudinal strands arranged such that a perpendicular cross section thereof forms a geometrical pattern;

(b) a spiral wire reinforcement wrapped about said arrangement of parallel prestressed longitudinal strands along the entire length thereof;

(c) said metallic longitudinal strands being partially prestressed at a low initial stress to provide high remaining material strength for use in absorbing high energy impact prior to reaching the yield strength of said longitudinal strands;

(d) said plurality of prestressed metallic longitudinal strands with spiral wire reinforcement being filled with and encased in high strength concrete to form a high-energy-absorbing prestressed concrete pile having high moment capacity.

2. A high-energy-absorbing prestressed concrete pile as in claim 1 wherein said metallic longitudinal strands are prestressed to approximately ¼ their yield strength for maximizing the energy that can be absorbed by said pile.

3. A high-energy-absorbing prestressed concrete pile as in claim 1 wherein the geometric pattern arrangement of said metallic longitudinal strands in a cross section of said pile is a square.

4. A high-energy-absorbing prestressed concrete pile as in claim 1 wherein the geometric pattern arrangement of said metallic longitudinal strands in a cross section of said pile is a series of rows of strands within a square parallel to the front and back of said pile.

5. A high-energy-absorbing prestressed concrete pile as in claim 4 wherein at least one inner row of strands is unstressed.

6. A high-energy-absorbing prestressed concrete pile as in claim 1 wherein the geometric pattern arrangement of said metallic longitudinal strands in a cross section of said pile is a circle.

7. A high-energy-absorbing prestressed concrete pile as in claim 1 wherein a cross section of said pile perpendicular to the longitudinal strands is square.

8. A high-energy-absorbing prestressed concrete pile as in claim 1 wherein a cross section of said pile perpendicular to the longitudinal strands is polygonal.

9. A high-energy-absorbing prestressed concrete pile as in claim 1 wherein some of the longitudinal strands on one side of the pile are stressed greater than the other strands.

10. A high-energy-absorbing prestressed concrete pile as in claim 1 wherein the prestressed longitudinal strands remain elastic until said concrete reaches a capacity of 0.003 inch/inch compression strain.

11. A high-energy-absorbing prestressed concrete pile as in claim 1 wherein fiber reinforcement is added to the concrete.

12. A high-energy absorbing prestressed concrete pile as in claim 1 wherein said concrete is normal weight high strength concrete having a compressive strength of 8000 psi at 28 days cure time.

13. In very high energy absorbing fendering system, including a plurality of spaced apart high-energy-absorbing prestressed concrete piles in a row and a foam filled fender, said prestressed concrete piles each comprising:

(a) a plurality of parallel prestressed metallic longitudinal strands arranged such that a perpendicular cross section thereof forms a geometrical pattern;

(b) a spiral wire reinforcement wrapped about said arrangement of parallel prestressed longitudinal strands along the entire length thereof;

(c) said metallic longitudinal strands being partially prestressed at a low initial stress to provide high remaining material strength for use in absorbing high energy impact prior to reaching the yield strength of said longitudinal strands;

(d) said plurality of prestressed metallic longitudinal strands with spiral wire reinforcement being filled with and encased in high strength concrete to form a high-energy-absorbing prestressed concrete pile having high moment capacity.

14. A very high energy absorbing fendering system as in claim 13 wherein the metallic longitudinal strands of said prestressed concrete piles are prestressed to approximately ¼ their yield strength for maximizing the energy that can be absorbed by said pile.

15. A very high energy absorbing fendering system as in claim 13 wherein the geometric pattern arrangement of said metallic longitudinal strands in a cross section of said prestressed concrete piles is a square.

16. A very high energy absorbing fendering system as in claim 13 wherein the geometric pattern arrangement of said metallic longitudinal strands in a cross section of said prestressed concrete piles is a series of rows of strands within a square parallel to the front and back of each pile.

17. A very high energy absorbing fendering system as in claim 13 wherein a cross section of said prestressed concrete piles perpendicular to the longitudinal strands is square.

18. A very high energy absorbing fendering system as in claim 13 wherein said concrete in said piles is normal weight high strength concrete having a compressive strength of 8000 psi at 28 days cure time.

19. A very high energy absorbing fendering system as in claim 13 wherein a prestressed concrete slab is attached to the face of said row of prestressed concrete piles against which said foam filled fender rides.

20. A very high energy absorbing fendering system as in claim 13 wherein said plurality of prestressed concrete piles are closely spaced together in said row.

21. A very high energy absorbing fendering system as in claim 13 wherein the prestressed longitudinal strands in each pile remain elastic until said concrete reaches a capacity of 0.003 inch/inch compression strain.

* * * * *